United States Patent
Jacob

(10) Patent No.: US 11,454,332 B2
(45) Date of Patent: Sep. 27, 2022

(54) ACTUATOR AND VALVE BLOCK

(71) Applicant: ECO Holding 1 GmbH, Marktheidenfeld (DE)

(72) Inventor: Thomas Jacob, Stuttgart (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 357 days.

(21) Appl. No.: 16/808,809

(22) Filed: Mar. 4, 2020

(65) Prior Publication Data

US 2020/0370674 A1    Nov. 26, 2020

(30) Foreign Application Priority Data

May 21, 2019  (DE) .......................... 102019113409.9

(51) Int. Cl.
| | |
|---|---|
| *F16K 31/06* | (2006.01) |
| *H01F 7/00* | (2006.01) |
| *H01F 7/16* | (2006.01) |
| *H01R 13/447* | (2006.01) |
| *H01F 7/06* | (2006.01) |
| *F16K 27/00* | (2006.01) |

(52) U.S. Cl.
CPC ....... *F16K 31/0675* (2013.01); *H01F 7/1607* (2013.01); *H01R 13/447* (2013.01); *F16K 27/003* (2013.01); *H01F 2007/062* (2013.01)

(58) Field of Classification Search
CPC .... F16K 31/0675; H01F 7/1607; H01F 7/126; H01F 7/127; H01F 7/121; H01F 7/16; H01F 2007/062; H01F 2007/163
See application file for complete search history.

(56) References Cited

U.S. PATENT DOCUMENTS

| | | | | |
|---|---|---|---|---|
| 5,113,896 | A * | 5/1992 | Tortellier | ............ F16K 31/0675 137/269 |
| 6,486,761 | B1 * | 11/2002 | Czarnetzki | ............ F16K 27/003 335/255 |
| 2010/0308244 | A1 * | 12/2010 | Oikawa | ............... F16K 11/0716 251/129.15 |
| 2011/0073791 | A1 * | 3/2011 | Oikawa | ................. H01F 7/1607 251/129.15 |
| 2013/0248743 | A1 * | 9/2013 | Kasagi | ................ F16K 31/0613 251/129.15 |
| 2018/0355993 | A1 * | 12/2018 | Peterson | ............. F16K 31/0675 |
| 2019/0244738 | A1 * | 8/2019 | Klenk | .................... H01F 7/1607 |
| 2020/0005978 | A1 * | 1/2020 | Kuramochi | ............. H01F 7/081 |
| 2020/0005979 | A1 * | 1/2020 | Kuramochi | ........... H01F 7/1607 |

FOREIGN PATENT DOCUMENTS

DE        102015102066 A1    8/2016

* cited by examiner

*Primary Examiner* — Kelsey E Cary
(74) *Attorney, Agent, or Firm* — Von Rohrscheidt Patents

(57) ABSTRACT

An actuator for a magnet valve, the actuator including a housing including a terminal wall including an opening; and an armature arranged in the housing and movable in an axial linear manner between a first end position and a second end position, wherein the opening is closed by a terminal cover, wherein the terminal cover includes a contour that protrudes at least in a direction towards the armature, and wherein the contour includes a first section that defines the second end position of the armature.

16 Claims, 2 Drawing Sheets

ACTUATOR AND VALVE BLOCK

RELATED APPLICATIONS

This application claims priority from and claims from reference German patent application DE 10 2019 113 409.9, filed on May 21, 2019.

FIELD OF THE INVENTION

The invention relates to an actuator, in particular for a magnet valve, a valve block including at least one actuator and a method for producing the actuator.

BACKGROUND OF THE INVENTION

Actuators, in particular in magnet valves, are well known in the art. DE 10 2015 102 066A1 discloses a central actuator, in particular for a magnet valve of a cam phaser, that includes a housing that envelopes the central actuator. The central actuator furthermore includes an actuation plunger that is arranged at an armature that is arranged in an armature chamber and axially moveable therein.

Actuators of this generic type are enveloped by a housing. The components within the housing have to be configured individually adapted and have to be arranged before the actuator can be installed, e.g., in a valve block. This requires complex individual and thus expensive planning.

BRIEF SUMMARY OF THE INVENTION

Thus it is an object of the invention to improve a configuration and function of the actuator recited supra.

According to an aspect of the invention, the object is achieved by an actuator for a magnet valve, the actuator including a housing including a terminal wall including an opening; and an armature arranged in the housing and movable in an axial linear manner between a first end position and a second end position, wherein the opening is closed by a terminal cover, wherein the terminal cover includes a contour that protrudes at least in a direction towards the armature, and wherein the contour includes a first section that defines the second end position of the armature.

The object is also achieved by valve block including at least one actuator recited supra.

The object is furthermore achieved by a method for producing the actuator recited supra, the method including defining the first end position of the armature and the second end position of the armature; selecting a terminal cover with a protruding contour that is oriented towards the armature, wherein a depth of the first section of the protruding contour corresponds to the second end position; and arranging and fixing the terminal cover at the housing.

Advantageous embodiments are provided in the dependent claims.

The improved actuator with the terminal cover has the advantage that the terminal cover and applying the terminal cover defines where the second end position of the armature is arranged. Thus, only the terminal cover has a contour that is individually adapted for the application, e.g., for a particular force development in the actuator, whereas identical or standardized components can be used otherwise. This leads to cost savings. An associated additional advantage is that a configurative adaptation with respect to the second end position of the actuator can still be performed in a late fabrication step, e.g., even when the actuator is already connected to a valve block or installed therein. Changing requirements placed on a product like, e.g., the valve block, can then be reacted to in a simple and quick manner.

Another advantage of the actuator according to the invention is that a contact surface is minimized by the protruding contour, in particular the first section of the contour, in a portion of an armature stop so that a hydraulic sticking of the armature in the basic position, in particular the second end position, is prevented.

According to an advantageous embodiment, the first section is formed by a first bead that is introduced on a side of the terminal cover that is oriented away from the armature. The first bead is advantageously configured annular. Introducing the first bead, advantageously an annular bead, facilitates fabricating a contour or partial contour in the first section wherein the contour or partial contour protrudes in a direction towards the armature. By the same token, the first bead has a stabilizing impact upon the terminal cover.

In another advantageous embodiment, the terminal cover includes at least one embossing instead of or in addition to the first bead, wherein the at least one embossing forms the first section or partially forms the first section. Thus, the embossing also counteracts a hydraulic sticking of the armature at the terminal cover.

Furthermore, the first section is configured particularly stiff. This facilitates a firm stop of the armature at the terminal cover and a positively defined second end position of the armature.

In a particularly advantageous embodiment, the first section protrudes in a predetermined depth and in axial direction into the housing. Thus, the depth of the first section determines the stop position of the armature within the housing. Choosing a terminal cover with a predetermined depth helps to individually adapt the second end position of the armature.

It is appreciated for the described embodiments that a defined stop position of the armature is provided, advantageously of a magnet armature in the base position or second end position. In a kit concept different base positions of the armature can be implemented in a simple manner by grooves and/or embossing's, e.g. by exchangeable inserts in a deep drawing tool that is used for producing the grooves and/or embossing's. In order to differentiate variants easily, stop variants of the terminal cover can be implemented differently by corresponding geometries or contours of an embossing according to a Poka-Yoke principle. The Poka-Yoke principle is a principle including plural elements which includes technical facilities or devices in order to discover or prevent faults immediately.

According to an advantageous embodiment, the contour includes a second section that is externally applied to the terminal wall. Also the second section is advantageously formed by a second bead that is introduced into a side of the terminal cover that is oriented away from the armature. The applied second section closes the opening in the terminal wall. The terminal cover is advantageously fixed at the terminal wall by welding outside of the second section. The first section of the contour that protrudes into the housing thus provides correct positioning of the terminal cover during welding.

The second section is advantageously configured elastically deformable. Simultaneously, the terminal cover is applied in a sealing manner to the housing or the terminal wall. The elastically deformable second section provides a sealing contact at the terminal wall when the terminal cover is applied to the terminal wall with pressure. According to another advantageous embodiment, the terminal cover is welded together with the terminal wall of the housing while the elastically deformable second section is applied to the terminal wall with pressure. Thus, the opening of the terminal wall is permanently sealed tight.

According to the invention, the terminal cover is made from a non-magnetic weldable material, advantageously stainless steel. This assures that magnetic fields within the actuator, in particular of an actuator that is configured as a magnet valve, are not influenced or disturbed, and a welded connection between the terminal cover and the terminal wall is possible. Stainless steel fulfills those two requirements and is very resilient. Furthermore, using a steel material that is not magnetizeable or only magnetizeable very little and advantageously has a thin wall prevents a magnetic sticking of the armature in the second end position or starting position.

Furthermore the terminal cover is connected with the housing by laser welding. Laser welding or laser beam welding is characterized by a high welding speed, narrow and slender weld shape and little thermal warpage. A welding method of this type is typically performed without additional material.

Laser welding is thus advantageously performed by face welding or through welding from an outside through the terminal cover to the housing or its terminal wall. Thus, a sealing of an armature chamber is performed. Due to the face welding, in particular by a laser requirements for positioning of components for the welding and the quality requirements upon these components in the cutting portion or in the portion of an outer contour are very much relaxed compared to circumferential welding at a cover edge and can thus be implemented in a cost effective manner.

In another advantageous embodiment the terminal cover includes plural annular contours with differently sized diameters. Thus, the contours of the terminal cover at least on a side that is oriented towards the armature are symmetrically arranged about a common axis. This is advantageously an axis of a housing element that is cylindrically configured in a portion of the armature. Advantageously the contours have different depths and protrude by a different distance from the terminal cover. This facilitates a particularly good adaptation of the terminal cover to an uneven contact surface at the terminal wall.

According to another advantageous embodiment a pole tube is arranged in the housing wherein the pole tube contacts the terminal cover. The pole tube is arranged in the actuator so that the armature is axially movable within the pole tube between two end positions.

Thus, the contour of the terminal cover advantageously includes a third section that is applied to the pole tube. Also the third section is advantageously formed by a bead that is introduced into a side of the terminal cover that is oriented away from the armature. The pole tube that penetrates into the opening of the terminal wall is closed by applying the third section to the pole tube. The terminal cover is also fixed at the terminal wall, advantageously by welding outside of the third section.

Thus, the third section is advantageously configured elastically deformable. Simultaneously the terminal cover is advantageously applied so that it seals the pole tube. A sealing contact at the pole tube is provided by an elastically deformable third section when the terminal cover is applied to the pole tube with pressure.

In an advantageous embodiment the terminal cover is welded together with the terminal wall of the housing while the elastically deformable third section is applied to the pole tube with pressure. Thus, the pole tube is permanently sealed at the terminal wall or at a side that is oriented towards the terminal cover.

The shape of the terminal cover described in the preceding embodiments and derivable from their combinations facilitates a high level of elasticity and flexibility in the down holding portion which helps to compensate component and assembly tolerances. For example a sudden buckling of the terminal cover through a lever effect is prevented.

A combined embodiment includes a stiffening by a contour in the contact portion that is formed by a bead while simultaneously decoupling relative to the pole tube by another contour portion formed by another bead.

According to another aspect the object is achieved by a valve block including an actuator according to one of the embodiments described supra. The valve block has similar advantages as the actuator according to the invention.

In an advantageous embodiment of the valve block plural actuators are provided wherein at least one of the respective terminal covers includes a contour or a section of a contour which protrudes further into an associated housing than at least one contour or a section of a contour of another terminal cover.

According to an additional aspect the object is achieved by a method for producing an actuator according to one of the preceding embodiments. The method has similar advantages as the actuator according to the invention and includes the steps defining a first and a second end position of the armature, selecting a terminal cover with a protruding contour that is oriented towards the armature, wherein a depth of at least one section of the contour corresponds to the previously defined second end position and arranging and fixing the terminal cover at the housing.

BRIEF DESCRIPTION OF THE DRAWINGS

Further advantages of the invention can be derived from the description and the drawing figures. The invention is subsequently described based on advantageous embodiments with reference to the drawing figures, wherein.

DETAILED DESCRIPTION OF THE INVENTION

Figure 1:
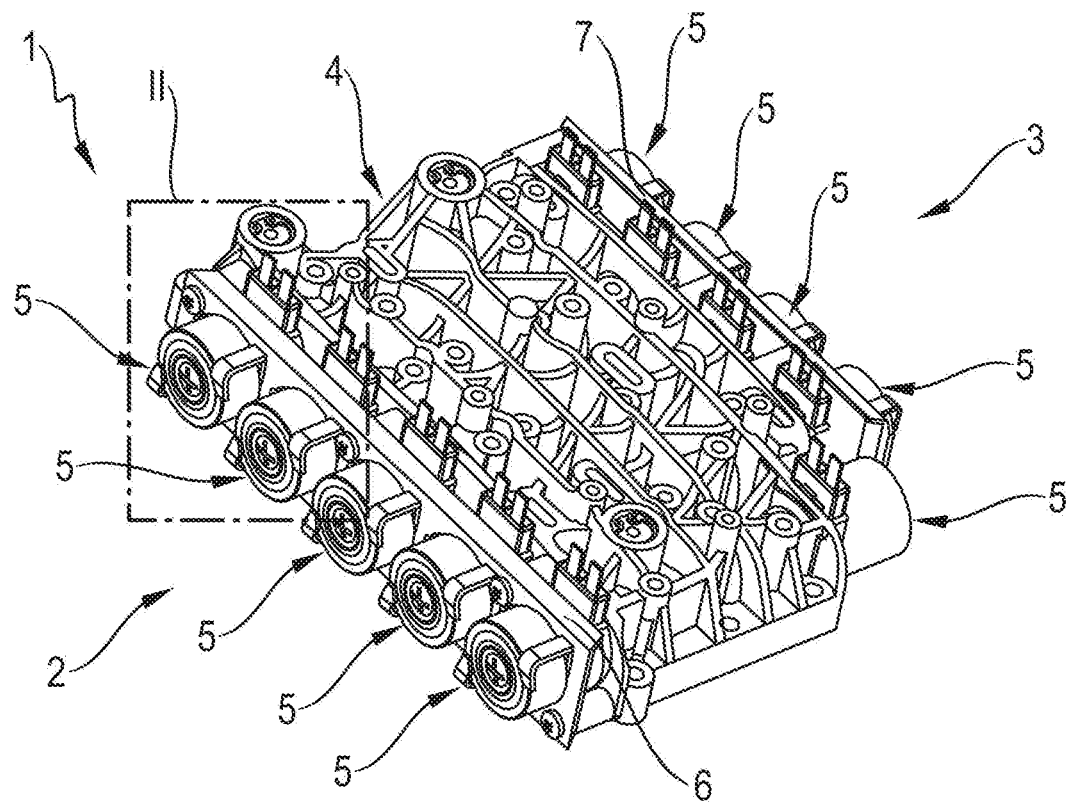
FIG. 1 illustrates a perspective view of a first valve block according to the invention.

FIG. 1 illustrates a valve block 1 according to the invention with a front side 2 and a back side 3. The core piece forms a central block element 4, wherein plural actuators 5 are respectively connected on the front side 2 and the back side 3, thus in particular actuators for pressure control valves. The actuators 5 are fixed on the front side 2 with a first support device 6 and on the back side 3 with a second support device 7.

The actuators 5 largely include standard components and have very similar configurations. However, details of the actuators 5 can differ due to different requirements, e.g. with respect to an inner force effect. A possible embodiment of an actuator 5 is described infra in more detail in FIGS. 2-4. The terms front side 2 and back side 3 are subsequently also used for describing the actuator 5.

Figure 2:
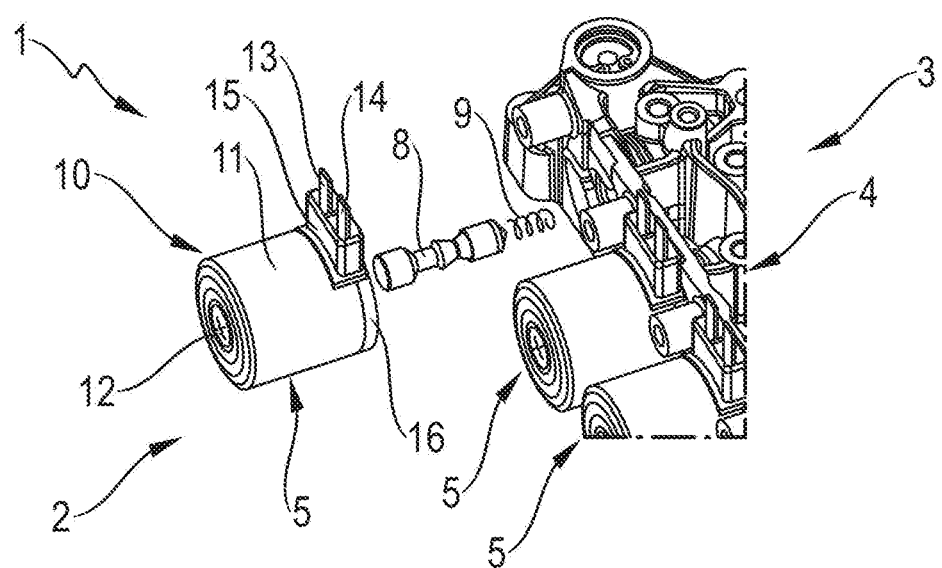
FIG. 2 illustrates the detail II of FIG. 1.

FIG. 2 illustrates a section of the valve block 1 of FIG. 1. Out of the components shown in FIG. 1, FIG. 2 only shows a portion of the central block element 4 and of the actuators 5 on the front side 2 of the valve block 1. Thus, an actuator 5 and additionally a slide 8 and a spring element 9 are illustrated separate from the valve block 1. The slide 8 and the spring element 9 are functionally associated with the separately illustrated actuator 5 which is referred to in the subsequent description.

Figure 3:
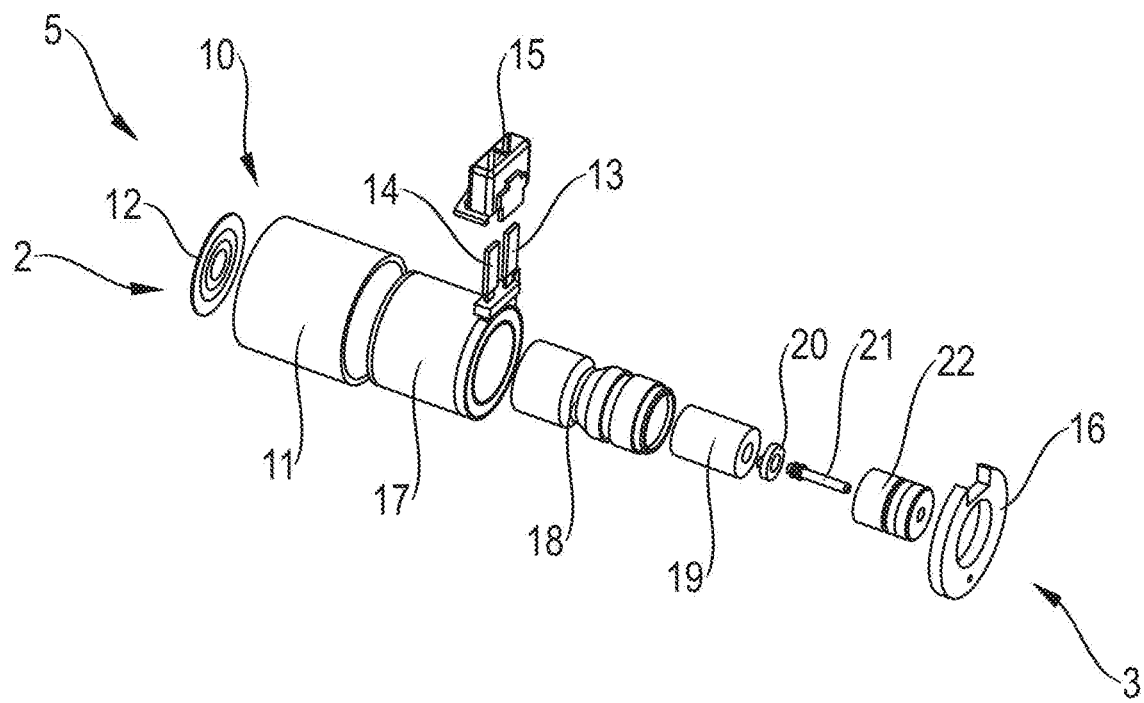
FIG. 3 illustrates a perspective exploded view of an actuator according to the invention.

The actuator 5 includes a housing device 10 with a housing 11 and a terminal cover 12 and additional elements which are described infra with respect to FIGS. 3 and/or 4. In the illustrated embodiment the housing 11 is cylindrical and the terminal cover 12 is configured circular or plate shaped. Additionally the actuator 5 includes a first power connection 13 and a second power connection 14 that extend from a protective device 15 and a terminal plate 16. Further details of the actuator 5 are illustrated in FIG. 3.

FIG. 3 illustrates an exploded view of the actuator 5 that is illustrated in FIG. 2 by itself. Out of the components that are already illustrated in FIG. 2 again the housing 11, the terminal cover 12, the power connections 13, 14 and the associated protective device 15 and the terminal cover 16 are shown. Additionally FIG. 3 illustrates the following components starting from the front side 2, a coil 17 that is connected with the power connections 13, 14, a pole tube 18, an armature 19, a damper insert 20, a plunger 21, and a plug connector 22.

Figure 4:
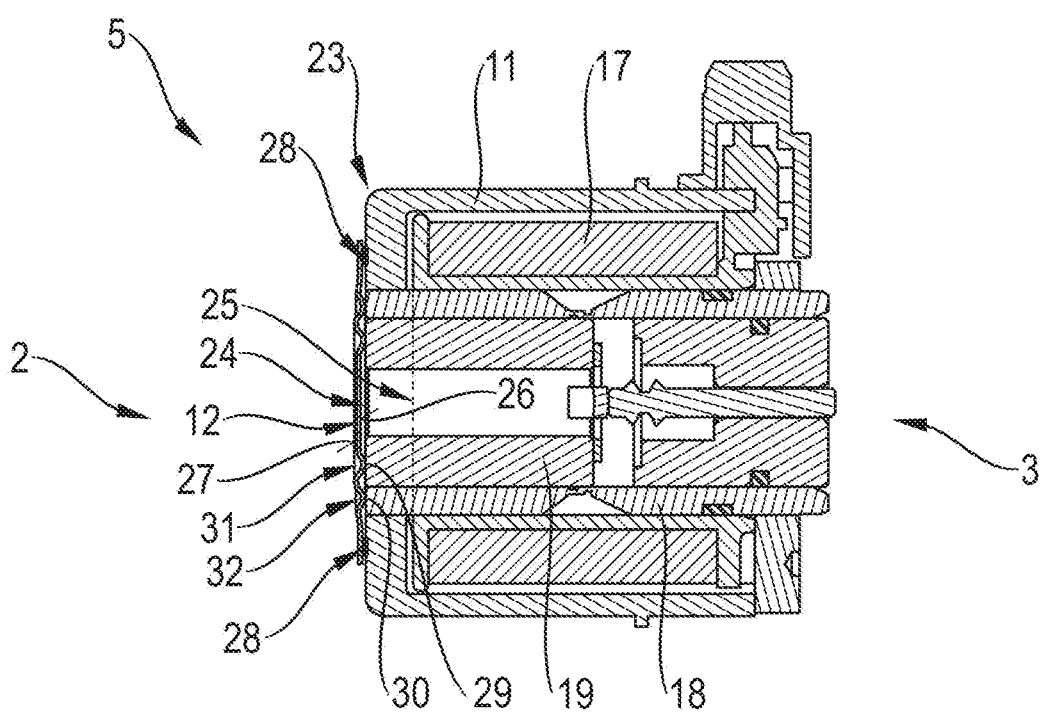
FIG. 4 illustrates a longitudinal sectional view of the actuator of FIG. 3.

FIG. 4 illustrates the actuator of FIG. 3 in a longitudinal sectional view. All illustrated components were already described with reference to FIG. 3 and are only partially provided with reference numerals in FIG. 4. It is evident from FIG. 4 that the housing 11 forms a terminal wall 23 on the front side 2 together with the terminal cover 12 and the armature 19 is arranged movable in the housing 11, in particular within the pole tube 18 between a first end position 24 and a second end position 25.

The terminal cover 12 includes an inner wall 26 and an outer wall 27, wherein the inner wall 26 is oriented towards the back side 3 and the outer wall 27 is oriented towards the front side 2. Thus, the terminal cover 12 is connected to the front side 3 of the housing 11 by a weld 28. The weld 28 is run from the outer wall 27 through the terminal cover 12 to the inner wall 26 and further to the housing 11 in an annular shape and performed by laser welding.

Additionally the terminal cover 12 includes two annular sections 29, 30 of a contour that protrude from the inner wall 26 in this embodiment, in particular a first section 29 and a third section 30. Thus, the first section 19 has a smaller ring radius than the third section 30. The first section 29 is applied to the armature 19 when the armature is in the illustrated second end position 25.

Another possible end position of the armature 19 is the first end position 24 which is indicated by a dashed line. More precisely the side of the armature 19 that is oriented towards the terminal cover 12 corresponds to the dashed line when the armature 19 is in the first end position 24. The third section 30 is thus applied to the pole tube 18.

It is appreciated that the section 30 is a third section and not a second section. In another embodiment that is not illustrated herein the front side 2 of the housing 11 is configured to extend to the armature 19 when the armature 19 is in its second end position 25 so that a section of the contour of the terminal cover does not contact the pole tube 18 but the housing 11. This section that contacts the housing is defined as the second section in the claims and in the preceding description. In order to keep the entire description consistent this terminology is also maintained in the figure description.

The sections 29 and 30 of the contour are formed by introducing two beads 31, 32 on an outside wall 27 of the terminal cover 12. Thus, a first bead 31 forms the first section 29 and a second bead 32 forms the third section 30 of the contour. The first bead 31 is configured stiff so that the first section 29 of the contour thus formed provides a firm stop for the armature 19. The second bead 32 of the contour is configured soft or elastically deformable so that the third section 30 of the contour thus formed can contact and seal at the pole tube 18, or at the housing 11 in another embodiment.

All features described and shown in particular embodiments can be used within the spirit and scope of the invention in various combinations at will at will to achieve their advantageous effects. The scope of patent protection is defined by the appended claims and is not limited by the features described in the description or illustrated in the drawing figure.

What is claimed is:

1. An actuator for a magnet valve, the actuator comprising:
   a housing including a terminal wall including an opening; and
   an armature arranged in the housing and movable in an axial linear manner between a first end position and a second end position,
   wherein the opening is closed and sealed towards ambient exclusively by a terminal cover,
   wherein an inside of the terminal cover includes a contour that protrudes at least in a direction towards the armature,
   wherein an outside of the terminal cover is exposed to ambient and includes a concave backside of a first bead that forms the contour,
   wherein the contour includes a first section that defines the second end position of the armature,
   wherein a pole tube is arranged in the housing, and
   wherein the pole tube contacts the terminal cover.

2. The actuator according to claim 1, wherein the first section is formed by the first bead that is introduced on a side of the terminal cover that is oriented away from the armature.

3. The actuator according to claim 1, wherein the first section is not elastically deformable.

4. The actuator according to claim 1, wherein the first section protrudes into the housing in the axial direction to a predetermined depth.

5. The actuator according to claim 1, wherein the contour includes a second section that is applied to an outside of the terminal wall.

6. The actuator according to claim 5, wherein the second section is configured elastically deformable.

7. The actuator according to claim 1, wherein the terminal cover is made from a non-magnetic weldable material or from stainless steel.

8. The actuator according to claim 1, wherein the terminal cover is connected to the housing by laser welding.

9. The actuator according to claim 1, wherein the terminal cover includes plural annular contours with differently sized diameters.

10. The actuator according to claim 1, wherein the contour of the terminal cover includes a third section forming a second bead that is applied to the pole tube where the pole tube contacts the terminal cover.

11. The actuator according to claim 10, wherein the first bead and the second bead are flush in an axial direction so that the armature and the pole tube are flush in the axial direction when the armature is in the second end position.

12. The actuator according to claim 10, wherein the third section is configured elastically deformable.

13. A valve block, comprising: at least one actuator according to claim 1.

14. The valve block according to claim 13,
wherein the at least one actuator includes plural actuators including respective terminal covers and respective housings, and
wherein at least one terminal cover of the respective terminal covers includes the contour or a section of the contour which protrudes further into an associated housing of the respective housings than at least one contour or a section of a contour of another terminal cover of the respective terminal covers.

15. A method for producing the actuator according to claim 1, the method comprising:
defining the first end position of the armature and the second end position of the armature;
selecting the terminal cover with the protruding contour that is oriented towards the armature,
wherein a depth of the first section of the protruding contour corresponds to the second end position; and
arranging and fixing the terminal cover at the housing.

16. The actuator according to claim 1, wherein the terminal cover is made from from sheet metal and welded to and sealed at the housing by a circumferential weld that is arranged with a radially inward offset from a circumferential edge of the terminal cover and with a radially outward offset from the first bead.

* * * * *